(12) United States Patent
Campisi

(10) Patent No.: US 6,257,347 B1
(45) Date of Patent: Jul. 10, 2001

(54) ROTATING ADJUSTABLE THREE POINT HITCH ASSEMBLY

(76) Inventor: Robert M. Campisi, 1513 S. Kimbrel Ave., Panama City, FL (US) 32404

( * ) Notice: Subject to any disclaimer, the term of this patent is extended or adjusted under 35 U.S.C. 154(b) by 0 days.

(21) Appl. No.: 09/499,657

(22) Filed: Feb. 8, 2000

(51) Int. Cl.$^7$ .................................................. A01B 59/00
(52) U.S. Cl. ............................................................ 172/439
(58) Field of Search ..................................... 172/439, 447, 172/443, 446, 449, 677, 679, 448, 680; 180/53.3, 53.1; 280/494, 478.1, 479.2, 492, 493, 515

(56) References Cited

U.S. PATENT DOCUMENTS

| 4,519,623 | * | 5/1985 | Orthman | 172/439 X |
| 5,423,394 | * | 6/1995 | Kendle | 180/53.3 |
| 5,823,270 | * | 10/1998 | Cooper | 172/439 |
| 5,971,082 | * | 10/1999 | Satzler | 172/439 |
| 5,975,216 | * | 11/1999 | Gibbons | 172/439 |
| 6,089,328 | * | 7/2000 | Moore et al. | 172/447 |

* cited by examiner

Primary Examiner—Robert E. Pezzuto
(74) Attorney, Agent, or Firm—William B. Noll

(57) ABSTRACT

A three point hitch assembly for attachment to the rear of a powered vehicle, such as a four wheel drive vehicle, for trailing an implement. The three point hitch assembly is pivotal in a horizontal plane to allow for decreased turning radius when the implement is rendered operable, and vertically adjustable for positioning the implement. The three point hitch assembly includes a fixed planar plate mounting device for removably securing the three point hitch assembly to the rear of the powered vehicle, and a pivotal main frame mounting a rotating planar base and adapted for pivotal movement on the fixed planar plate. The pivotal main frame includes an L-shaped member, fixedly secured to the rotating planar base, a transverse arm having a pair of free ends, with each end pivotally mounting a lifting arm, where a free end of each lifting arm includes a mounting device for removably securing the implement. Additionally, there is included at least one adjustable leveling arm.

9 Claims, 4 Drawing Sheets

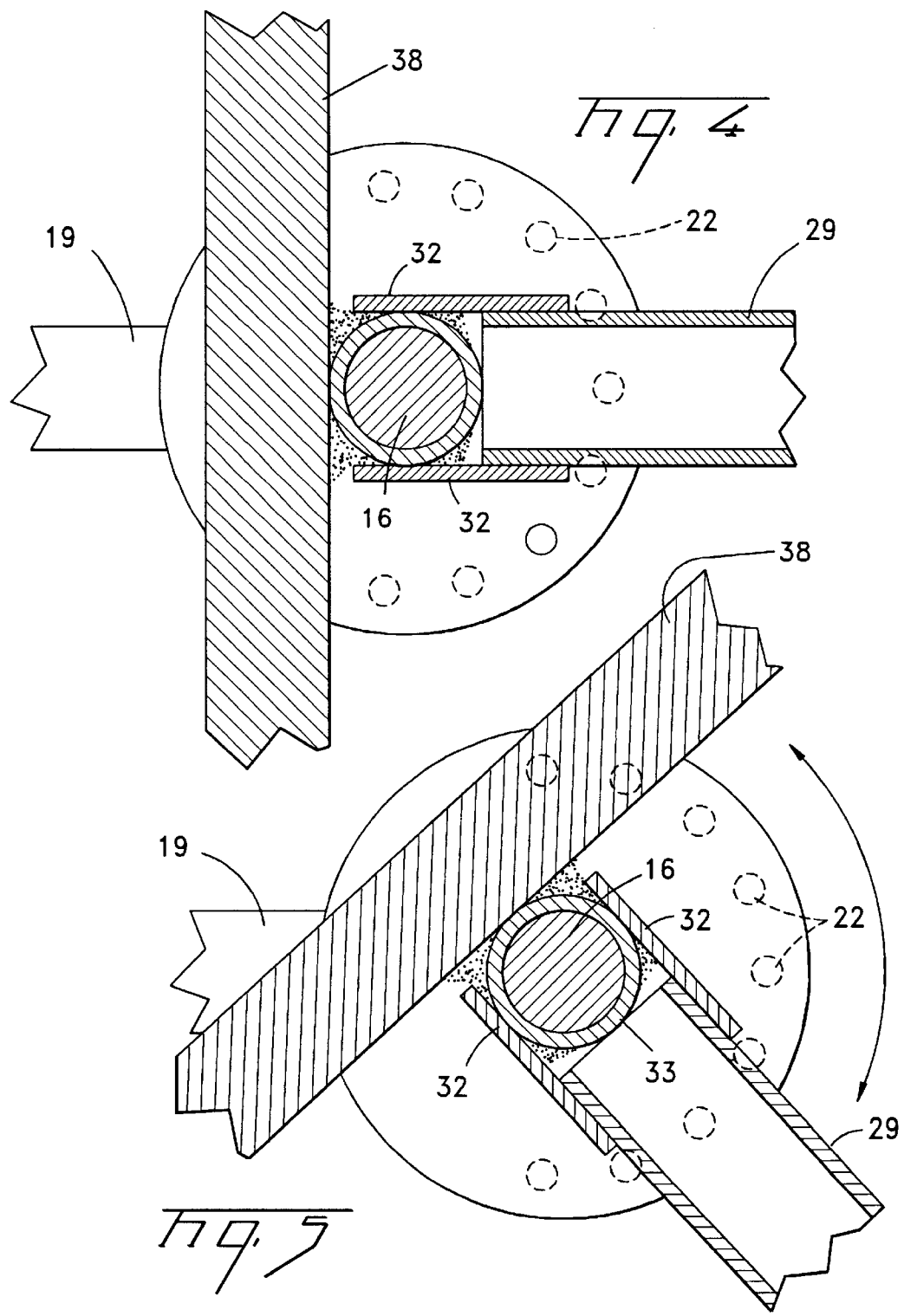

ROTATING ADJUSTABLE THREE POINT HITCH ASSEMBLY

FIELD OF THE INVENTION

This invention is directed to the field of three point hitches for trailing by a variety of powered vehicles, where the hitch is vertically adjustable and horizontally pivotal.

BACKGROUND OF THE INVENTION

The present invention relates to a three point hitch of the type to be mounted to the rear of a powered vehicle, such as a four-wheel drive vehicle or pickup truck, by way of example, for pulling a variety of implements and tools, i.e. disk, plow, powered mower deck, box blade, landscape rake or similar apparatus.

For years farmers have used tractors to pull trailing implements through fields. Conventional three point hitches, as well as single drawbars, are typical of hitches utilized at the rearward end of the tractor to provide the necessary connection between the tractor and the trailing implement. However, tractors are generally slow moving vehicles. As a consequence, three point hitches and accessories have been developed for different types of vehicles. Prior art describing such hitches and accessories is reflected by the following U.S. Patents:

a.) U.S. Pat. No. 5,746,275, to Cross, et al., teaches a three-point hitch for all terrain vehicles (ATV). The hitch comprises a mounting frame which is attached to the axle housing of the ATV. The mounting frame is supported on the tongue hitch of the ATV and is attached to the body of the ATV so that the rear suspension of the ATV is locked-out. The multiple-point hitch is operatively secured to the mounting frame and is raised and lowered by means of an electromechanical screw actuator. The multiple-points of the hitch are free to float, in some situations, with respect to the mounting frame and the ATV.

b.) U.S. Pat. No. 5,423,394, to Kendle, describes a three point hitch for Hummer truck, stake truck, pickup truck, farm tractor front mount, or trailer frame. The three point hitch is mounted on the rear bumper of a Hummer or pickup, the back of the bed of a stake truck, and braced to the frame or bed determined by mounting height. It is also adaptable to farm tractor front mount, other vehicles and trailer frames with proper bracketing. The hitch has a pair of lower lift arms and an adjustable top link to allow the mounting of standard three point agricultural equipment. It has a frame assembly with a rock shaft containing a cylinder crank arm and outer crank lift arms, hydraulic cylinder, two drag links and two lower lift arms. It also contains a two inch square receiver for use of any standard two inch towing slider, and a power take-off shaft assembly to power accessories. All moving parts are easily removable from the basic frame allowing free turning radius when used in towing operations.

c.) U.S. Pat. No. 4,519,623, to Orthman, is directed to a tractor front end hitch comprising a main frame removably secured to the front end of a tractor and having a pair of lower lift arms pivotally secured thereto and extending forwardly therefrom for connection to the implement. A pair of upper lift arms are pivotally secured at their rearward ends to the main frame and extend forwardly therefrom above the lower lift arms. A length adjustable float arm assembly is pivotally connected at its upper end to the forward end of each of the upper lift arms and is pivotally connected at its lower end to one of the lower lift arms rearwardly of the forward end thereof. Each of the float arm assemblies has a clevis element at the lower end which is provided with an elongated slot to permit the associated lift arm to vertically move or float relative to the upper lift arm associated therewith. A float stop pin is removably insertable into the slot in the clevis element to limit the float. A top link is pivotally secured at its rearward end to the main frame and extends forwardly therefrom for connection to the implement. Each of the lower lift arms has a box frame construction to achieve the desirable compressive strength for the lift arm and for limiting the lateral sway or movement of the lift arm.

While the above prior art offer some answers for providing a three point hitch for attachment to a vehicle other than a tractor, none teach an inexpensive system which allows an infrequent user an easy means for attaching an implement to the rear of his vehicle, where the three point hitch has the versatility to rotate, move vertically and horizontally for leveling. The manner by which the present invention achieves the goals hereof will become apparent in the description to follow, particularly when read in conjunction with the accompanying drawings.

SUMMARY OF THE INVENTION

The present invention is directed to a three point hitch assembly for attachment to the rear of a powered vehicle, such as a four wheel drive vehicle or trailor, for trailing an implement. The three point hitch assembly is pivotal in a horizontal plane to allow for decreased turning radius when the implement is rendered operable, and vertically adjustable for positioning the implement. The three point hitch assembly comprises a fixed planar plate mounting means for removably securing the three point hitch assembly to the rear of the powered vehicle, and a pivotal main frame mounting a rotating planar base and adapted for pivotal movement on the fixed planar plate. The pivotal main frame includes an L-shaped member, fixedly secured to the rotating planar base. The L-shaped member consists of a first leg arranged parallel to the planar base, and a second leg extending essentially vertically therefrom, where each leg is provided with plural aligned apertures, and the distal end of the second leg mounts a winch. Further, the pivotal main frame includes a transverse arm having a pair of free ends, with each end pivotally mounting a lifting arm, where a free end of each lifting arm includes means for removably securing the implement. Additionally, there is included at least one adjustable leveling arm extending between at least one of the lifting arm and a link assembly, and an adjustable link member extending between the link assembly and a selected position with one of the aligned apertures. Finally, a winch line is provided and extends between the link assembly and the winch to operatively adjust and position the pivotal main frame.

Accordingly, an object of this invention is to provide an inexpensive means to attach an implement to the rear of one's vehicle, and avoid the unneeded expense of owning a tractor.

Another object hereof is the provision of a three point hitch assembly that rotates to allow the user to make a decreased turning radius while the implement is operating.

A further object lies in the use of a remote means, such as in the vehicle, to operative position the three point hitch assembly.

A still further object of the invention is the provision of attaching the three point hitch assembly to one's vehicle without the need for a receiver shaft.

Yet another object hereof is a convenient means to adjust the assembly up and down such as for lifting or dumping material from the implement.

These and other objects will become more apparent to those skilled in the art from the following description.

BRIEF DESCRIPTION OF DRAWINGS

FIGS. 4 and 5 are horizontal sectional views of the rotary mechanism of FIG. 3, showing respectively, a normal relationship for pulling an implement, and an exemplary turning relationship for the rotary mechanism.

DETAILED DESCRIPTION OF PREFERRED EMBODIMENT

Figure 1:
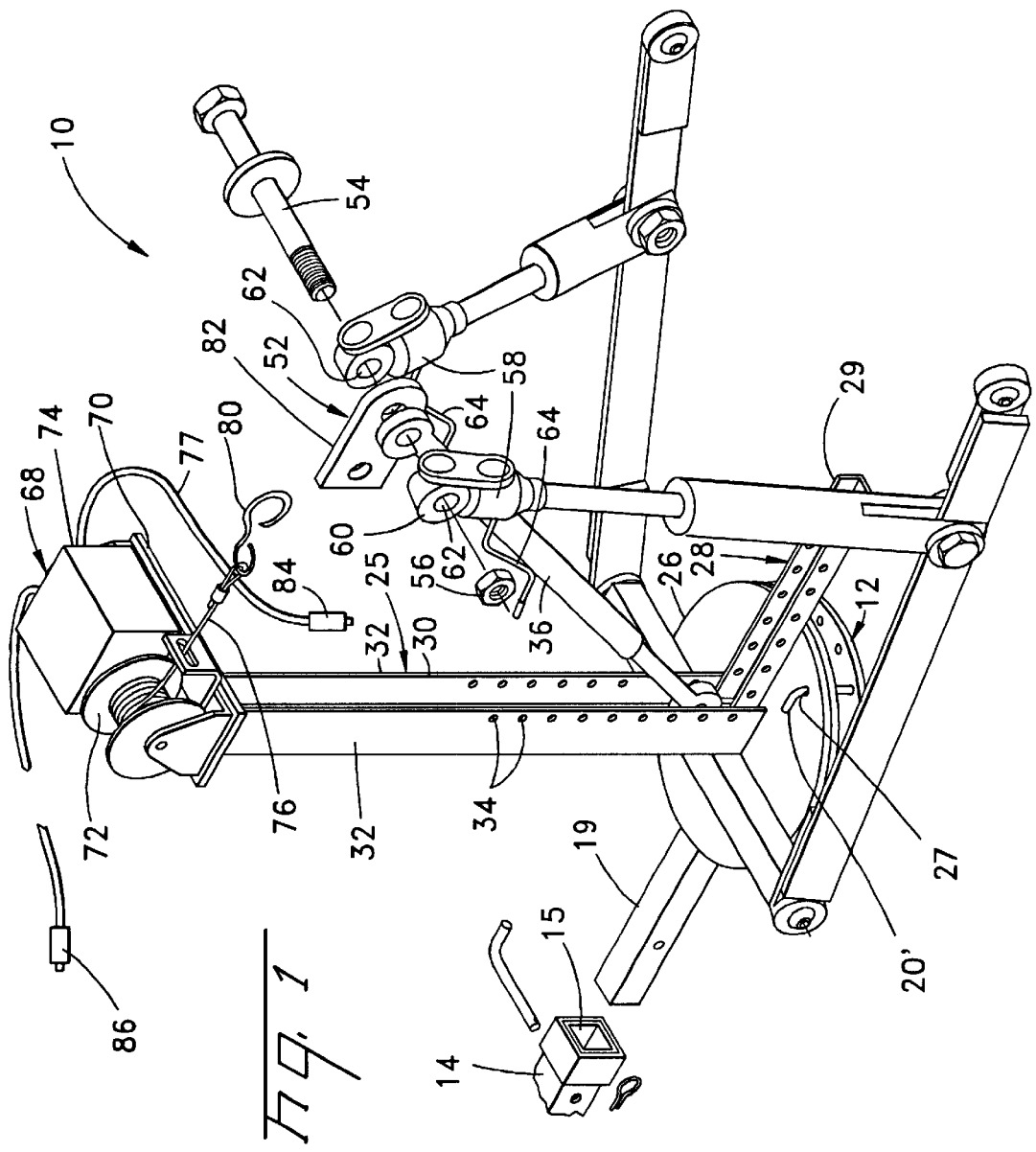
FIG. 1 is a partially exploded perspective view of the three point hitch assembly according to the present invention.

This invention relates to a pivotal and vertically adjustable three point hitch assembly for mounting to a powered vehicle, and trailing a selected implement, such as a box blade, disk, mower deck, or the like. The three point hitch assembly will now be described with regard to the several Figures, where like reference numerals represent like components or features throughout the several views.

Figure 2:
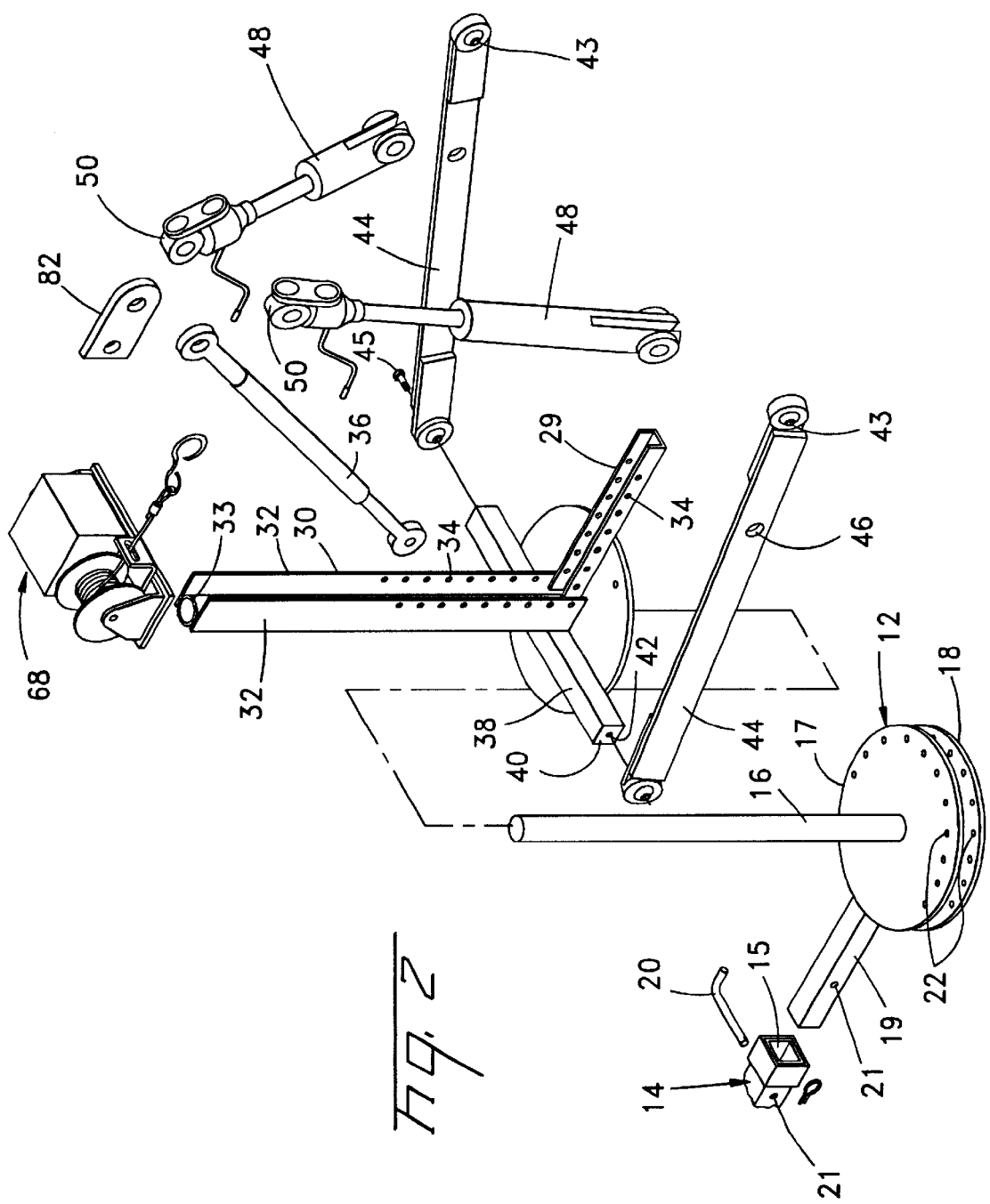
FIG. 2 is a fully exploded perspective view of the three point hitch assembly hereof.

Turning now to the various Figures, where FIGS. 1 and 2 illustrate the three point hitch assembly 10 of this invention in perspective, partially and fully exploded, respectively, the three point hitch assembly 10 comprises a fixed planar, metal base 12 extending from and secured to a vehicle connection member 14, which, as known in the art, consists of a generally rectangular channel, such as a 2" receiver 15, for telescopically engaging a complementary rectangular member, as later described. To secure them in engaging relationship, the respective channels have aligned apertures for receiving a locking pin. By this simple arrangement, the three point hitch assembly 10 may be readily removed from the vehicle allowing normal use of the vehicle, particularly where such vehicle may be a road vehicle, like a 4-wheel drive vehicle.

Extending vertically from the fixed planar base 12, which is preferably circular in configuration, is a fixed rod 16, FIGS. 2 and 3, to telescopically receive a tubular member, as hereinafter described, for pivotal movement about said fixed rod 16. The fixed planar base 12, preferably comprises a pair of spaced apart, circular planar members 17, 18, each secured, such as by welding to fixed rod 16, with a tubular member 19 extending therebetween. The tubular member 19 is sized to telescopically engage the receiver 15, as noted above, and be removably secured thereto by pin 20 through aligned apertures 21, see FIGS. 1 and 2. A further feature of the planar base 12, the function of which will become clearer hereafter, is the series of radially positioned, aligned openings 22 near the periphery of the respective circular planar members 17, 18.

The second major component of the three point hitch assembly of this invention is the main frame member 25. The main frame member 25 comprises a rotating metal base 26, preferably circular in configuration, adapted to lie contiguous with and rotate relative to fixed planar base 12. The metal base 26 features at least one opening 27 which is positioned to be aligned with the openings 21, in the assembled and operative condition, to temporarily fix the metal base 26 to the respective metal bases 17, 18, as desired. As best seen in FIGS. 1 and 2, the rotating metal base 26 an L-shaped, metal member 28 consisting of a lateral arm 29 and a vertical arm 30. The vertical arm 30 is preferably channel configured and defined by parallel sides 32, and tubular member 33, secured, such as by welding, to sides 32, see FIGS. 4 and 5. The tubular member 33 is sized to be slidably received on fixed rod 16, as further explained later. Finally, each of the arms 29, 30 include aligned apertures 34 for temporarily mounting an adjustable top link 36, as discussed hereafter.

The rotating metal base 26 further mounts a forward transverse member 38, such as a square bar, having a pair of end faces 40, where each said end face 40 includes an aperture 42 for pivotally securing a lifting arm 44 by fastening member 45. The respective lifting arms 44 are arranged to diverge rearwardly from the transverse member 38, where the free ends 40 include aperture means 43 for attaching a selected implement or tool, as known in the art.

Intermediate along at least one of said lifting arm 44 is an aperture 46 for pivotally mounting an adjustable leveling arm 48. Preferably, each lifting arm 44 mounts an adjustable leveling arm 48, where the opposite ends 50 are secured to a common link assembly 52, see FIG. 1. The link assembly 52 may consist of a shaft 54, threaded at one or both ends to receive containment bolts 56. The opposite ends 50, of the one or more leveling arms 48, include a rotary head 58 having an extension 60 containing an opening 62 to be received on said shaft 54. Since the leveling arm 48 is axially adjustable, the rotary head 58 includes a manually activated rotating handle 64 to effect such adjustment. A commercial leveling arm is a 22" Heavy Duty Leveling Box Assembly, with a 1" shaft, manufactured by Riverside Tractor Parts, Inc.

A further feature of the main frame member 18 is an axially adjustable top link 36. The top link 36 extends between the link assembly 52 and one of the aligned apertures 34. A commercially available top link is an Adjustable Top Link, 24" center tube, cat. 1 ends, manufactured by Riverside Tractor Parts, Inc. The many apertures 34 allows for a variety of settings for the top link 66.

Finally, to effect lifting of the trailing implement or tool (not shown), a remotely controlled means, such as a winch assembly 68 or hydraulic ram/cylinder, may be provided. The winch assembly 68, for example, may comprise a mounting base 70, conveniently positioned on the top of vertical arm 30, to which is secured a winch wind-up reel 72 and associated motor 74. By means known in the art, the motor 74 may be electrically operated by remote means 76 adjacent the assembly, or from within the vehicle cab. Operable on the wind-up reel 72 is a cable 76 secured at its free end 78 to a hook 80, which in turn may be secured to linkage member 82, or other means, such as another hook arrangement. In each case, the remotely operated winch assembly 68 operates to effect a lifting or lowering action to the link assembly 52, and hence the main frame member 25.

Figure 3:
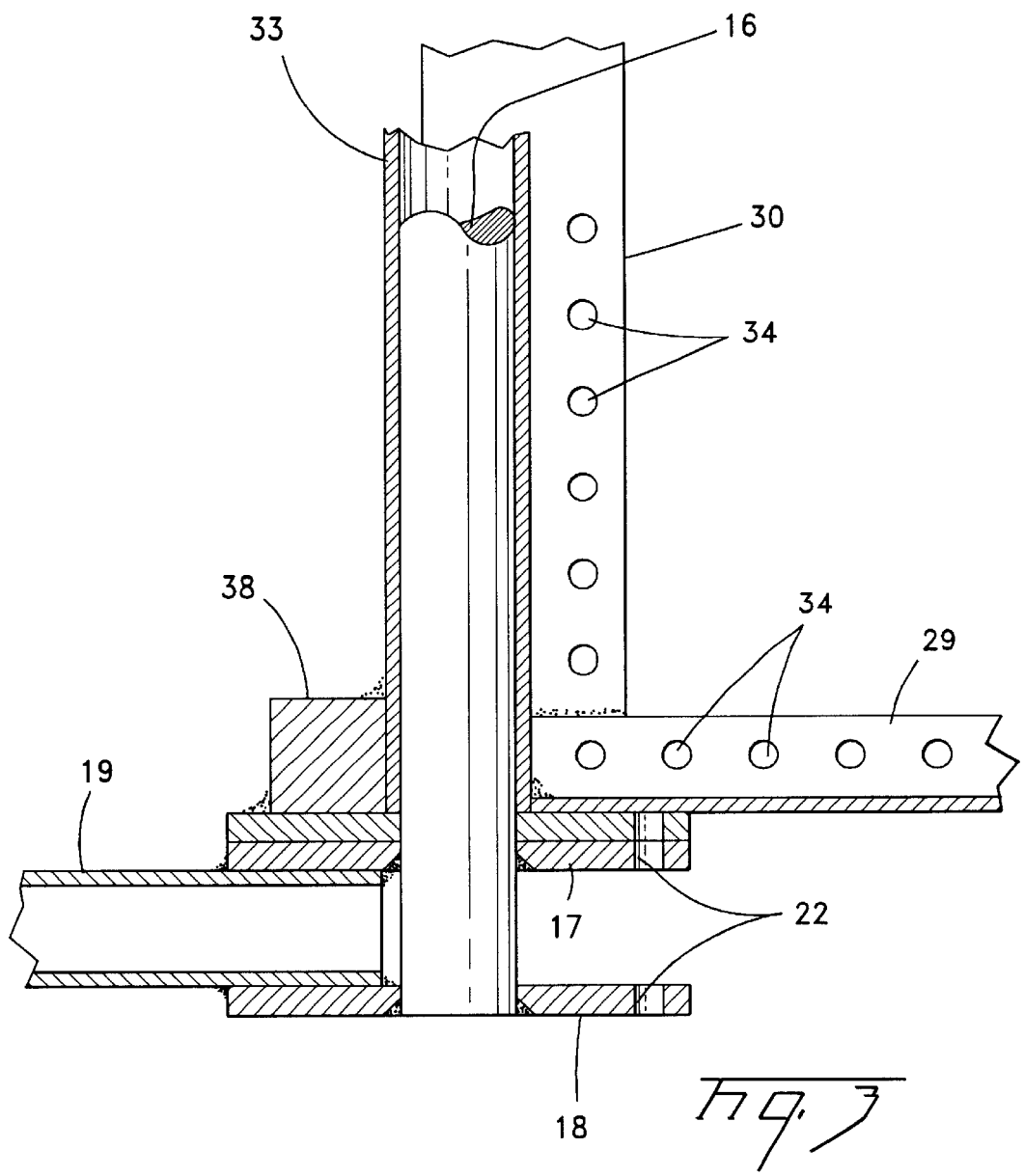
FIG. 3 is an enlarged, partial sectional view of the rotary mechanism forming a part of the three point hitch assembly of this invention.

FIGS. 3 and 4 illustrate together one of the unique features of the three point hitch assembly 10 of this invention. The main frame member 25, and its associated hardware, is rotatable about the fixed rod 16, which allows the operator, when trailing the assembly with an attached implement, to make sharper and easier turns. However, if the operator wishes to fix the relationship between the frame member 25 and fixed planar base 12, the desired relationship may be set by aligning the apertures 21 with opening 27 and inserting pin 20' therethrough—see FIG. 1.

Besides the rotating capabilities of the assembly 10, vertical adjustments can be made by the top link 36, especially with the numerous connections available, and selectively by one or both leveling arms 48. Finally, remote means are provided to operate the winch assembly 68, which means may be electrically connected to the vehicle's battery. Specifically, the remote means may be an operable switch 84 at or convenient to the vertical arm 30, or a remote, hand operable device 86 located within the vehicle cab. Further, particularly with the remote cab device 86, to operate and observe the operation of the three point hitch assembly from the cab, one or more mirrors (not illustrated) may be positioned on the assembly 10 at appropriate locations for purposes of observing the operation.

It is recognized that changes, variations and modifications may be made to the three point hitch assembly of this invention, particularly by those skilled in the art, from a reading of these specifications. Accordingly, no limitation is intended to be imposed thereon except as set forth in the following claims.

What is claimed is:

1. A three point hitch assembly for connection to the rear of a powered vehicle for trailing an implement, where the three point hitch assembly is pivotal in a horizontal plane to allow for decreased turning radius when said implement is operable, and vertically adjustable, said three point hitch assembly comprising:
   a.) a fixed planar plate mounting means for removably securing said three point hitch assembly to the rear of said powered vehicle; and,
   b.) a pivotal main frame mounting a rotating planar base and adapted for pivotal movement on said fixed planar plate, said pivotal main frame further including,
      (i.) an L-shaped member, fixedly secured to said rotating planar base, having a first leg arranged parallel to said planar base, and a second leg extending essentially vertically therefrom, where each said leg is provided with plural aligned apertures, and the distal end of said second leg mounts means for raising and lowering said implement;
      (ii.) a transverse arm having a pair of free ends, each said end pivotally mounting a lifting arm, where a free end of each said lifting an includes means for removably securing said implement;
      (iii.) at least one adjustable leveling arm extending between at least one said lifting arm and a link assembly;
      (iv.) an adjustable link member extending between said link assembly and a selected position with one of said aligned apertures; and
      (v.) means extending between said link assembly and said raising and lowering means to operatively adjust and position said pivotal main frame.

2. The three point hitch assembly according to claim 1, wherein there are a pair of adjustable leveling arms, one said arm connected to each said lifting arm.

3. The three point hitch assembly according to claim 2, wherein said adjustable leveling arms are axially adjustable.

4. The three point hitch assembly according to claim 1, wherein said raising and lowering means is a hydraulic unit.

5. The three point hitch assembly according to claim 1, wherein said raising and lowering means comprises an electrically powered winch assembly, said winch assembly being mounted atop said second leg, and includes remote means for operating said winch assembly.

6. The three point hitch assembly according to claim 1, wherein said link assembly comprises a threaded member and said adjustable leveling arm and said adjustable link member include apertures for receiving said threaded member.

7. The three point hitch assembly according to claim 1, wherein said first and second legs are U-shaped and positioned to pivotally mount said adjustable link member.

8. The three point hitch assembly according to claim 7, wherein said adjustable link member is axially adjustable.

9. The three point hitch assembly according to claim 1, wherein said second leg includes an upper end having a horizontally disposed plate mounting said winch.

* * * * *